United States Patent
Su et al.

(10) Patent No.: US 10,462,471 B2
(45) Date of Patent: Oct. 29, 2019

(54) DATA PROCESSING METHOD, COMMUNICATIONS DEVICE, AND COMMUNICATIONS SYSTEM

(71) Applicant: Huawei Technologies Co., Ltd., Shenzhen (CN)

(72) Inventors: Wei Su, Chengdu (CN); Maarten Petrus Joseph Vissers, Amsterdam (NL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/835,013

(22) Filed: Dec. 7, 2017

(65) Prior Publication Data

US 2018/0098076 A1    Apr. 5, 2018

Related U.S. Application Data (63) Continuation of application No. PCT/CN2016/084997, filed on Jun. 6, 2016.

(30) Foreign Application Priority Data

Jun. 8, 2015    (CN) .......................... 2015 1 0310590

(51) Int. Cl.
*H04J 3/16*    (2006.01)
*H04N 19/176*    (2014.01)
(Continued)

(52) U.S. Cl.
CPC .............. *H04N 19/176* (2014.11); *H04J 3/07* (2013.01); *H04J 3/1611* (2013.01);
(Continued)

(58) Field of Classification Search
CPC .......... H04N 19/176; H04J 3/16; H04J 14/02; H04J 3/1658; H04J 14/0246
See application file for complete search history.

(56) References Cited

U.S. PATENT DOCUMENTS 7,369,496 B1 *   5/2008   Wiggins .............. H04L 12/4013
                                                           370/235
7,869,486 B2 *   1/2011   Kim .................. H04L 25/03006
                                                           375/148
(Continued)

FOREIGN PATENT DOCUMENTS

CN         1734986 A        2/2006
CN       101299649 A       11/2008
(Continued)

OTHER PUBLICATIONS

Machine Translation and Abstract of Chinese Publication No. CN101299649, Nov. 5, 2008, 14 pages.
(Continued)

*Primary Examiner* — Chi Ho A Lee
(74) *Attorney, Agent, or Firm* — Conley Rose, P.C.

(57) ABSTRACT

A data processing method, a communications device, and a communications system, where in a process of transmitting a packet service, a code block stream carrying the packet service is first obtained, then, rate adaptation is performed on the obtained code block stream, and finally, the rate-adapted code block stream is mapped to an optical channel payload unit (OPU) signal. Compared with a mapping manner in which a Generic Framing Procedure (GFP) is used, the data processing method, the communications device, and the communications system feature low processing complexity and/or high bandwidth utilization.

20 Claims, 6 Drawing Sheets

(51) Int. Cl.
*H04L 1/00* (2006.01)
*H04J 14/02* (2006.01)
*H04L 12/40* (2006.01)
*H04J 3/07* (2006.01)
*H04L 25/49* (2006.01)

(52) U.S. Cl.
CPC ........ *H04J 3/1658* (2013.01); *H04J 14/0246* (2013.01); *H04L 1/00* (2013.01); *H04L 12/40032* (2013.01); *H04L 25/4908* (2013.01); *H04J 2203/0089* (2013.01)

(56) References Cited

U.S. PATENT DOCUMENTS

| | | | |
|---|---|---|---|
| 8,155,148 | B2 | 4/2012 | Surek et al. |
| 9,231,721 | B1* | 1/2016 | Varadarajan .......... H04J 3/1652 |
| 2003/0120799 | A1* | 6/2003 | Lahav .................... H04J 3/1611 709/236 |
| 2003/0152079 | A1 | 8/2003 | Loeffler et al. |
| 2004/0013129 | A1* | 1/2004 | Fang ..................... H04J 3/1617 370/466 |
| 2004/0156325 | A1* | 8/2004 | Perkins ...................... H04J 3/07 370/299 |
| 2004/0156390 | A1* | 8/2004 | Prasad .................. H04J 3/1617 370/466 |
| 2004/0202198 | A1 | 10/2004 | Walker et al. |
| 2005/0286521 | A1* | 12/2005 | Chiang ................. H04J 3/1652 370/389 |
| 2006/0233194 | A1* | 10/2006 | Loprieno .............. H04J 3/1658 370/466 |
| 2007/0071033 | A1* | 3/2007 | Surek .................... H04J 3/1611 370/474 |
| 2007/0076769 | A1 | 4/2007 | Zou |
| 2007/0230495 | A1* | 10/2007 | Li ......................... H04J 3/1617 370/412 |
| 2009/0185578 | A1* | 7/2009 | Zeng .................. H04L 12/4633 370/466 |
| 2010/0098415 | A1 | 4/2010 | Jiang |
| 2015/0236957 | A1* | 8/2015 | Albanese .............. H04L 47/193 370/235 |

FOREIGN PATENT DOCUMENTS

| | | |
|---|---|---|
| CN | 101335750 A | 12/2008 |
| CN | 101578795 A | 11/2009 |
| CN | 101651512 A | 2/2010 |
| CN | 2012004839 A | 1/2012 |

OTHER PUBLICATIONS

Machine Translation and Abstract of Chinese Publication No. CN101578795, Nov. 11, 2009, 40 pages.
Foreign Communication From a Counterpart Application, Chinese Application No. 201510310590.2, Chinese Office Action dated Nov. 5, 2018, 7 pages.
Foreign Communication From a Counterpart Application, Chinese Application No. 201510310590.2, Chinese Search Report dated Oct. 24, 2018, 2 pages.
Machine Translation and Abstract of Japanese Publication No. JP2012004839, Jan. 5, 2012, 25 pages.
'Series G: Transmission Systems and Media, Digital Systems and Networks, Data over Transport—Generic aspects—General Series Y: Global Information Infrastructure, Internet Protocol Aspects and Next-Generation Networks Internet protocol aspects—Transport, Generic framing procedure. Telecommunication Standardization Sector of ITU, G.7041/Y.1303, Apr. 2011, 82 pages.
Foreign Communication From a Counterpart Application, PCT Application No. PCT/CN2016/084997, English Translation of International Search Report dated Jul. 26, 2016, 2 pages.
Foreign Communication From a Counterpart Application, PCT Application No. PCT/CN2016/084997, English Translation of Written Opinion dated Jul. 26, 2016, 6 pages.
AMCC, "Information Transparent Transport of 10 GbE LAN Signals over OTN," XP017407196, COM 15-D 79-E, Nov. 29-Dec. 3, 2004, 15 pages.
Huawei Technologies, "Considering potential implications of Flex Ethernet on OTN," XP044129565, WD11-37, Mar. 20, 2015, 7 pages.
Calderon, J., et al., "Adaptation of FlexEthernet to the OTN Transport Network;" XP044129572, WD11-49, Mar. 16-20, 2015, 6 pages.
Altera NTC, "Considerations on FlexE and B100G packet mapping," XP044136838, COM 15-C 1184-E, Jun. 3, 2015, 4 pages.
Foreign Communication From a Counterpart Application, European Application No. 16806792.4, Extended European Search Report dated Apr. 12, 2018, 8 pages.
Machine Translation and Abstract of Chinese Publication No. CN101651512, Feb. 17, 2010, 12 pages.
Foreign Communication From A Counterpart Application, Chinese Application No. 201510310590.2, Chinese Office Action dated Jun. 13, 2019, 10 pages.
"Series G: Transmission Systems and Media, Digital Systems and Networks, Digital terminal equipment—General, Series Y: Global Information Infrastructure, Internet Protocol Aspectsand Next-Generation Networks, Internet protocol aspects—Transport, Interfaces for the optical transport network (OTN), Amendment 4," ITU-T G.709/Y.1331, Jan. 2015, 14 pages.

* cited by examiner

FIG. 1

```
Obtain a code block stream that carries a packet service    S101
                          ↓
Perform rate adaptation on the obtained code block stream    S103
                          ↓
Map the rate-adapted code block stream to an OPU signal      S105
```

DATA PROCESSING METHOD, COMMUNICATIONS DEVICE, AND COMMUNICATIONS SYSTEM

CROSS-REFERENCE TO RELATED APPLICATIONS

This application is a continuation of International Patent Application No. PCT/CN2016/084997 filed on Jun. 6, 2016, which claims priority to Chinese Patent Application No. 201510310590.2 filed on Jun. 8, 2015. The disclosures of the aforementioned applications are hereby incorporated by reference in their entireties.

TECHNICAL FIELD

The present disclosure relates to the field of communications technologies, and in particular, to a data processing method, a communications device, and a communications system.

BACKGROUND

Currently, as a core technology of a transport network, an optical transport network (OTN) technology includes electrical-layer and optical-layer technical specifications, and features diverse operation, administration, and maintenance (OAM) functions, a powerful tandem connection monitoring (TCM) capability, and a powerful out-of-band forward error correction (FEC) capability. This can implement flexible scheduling and management for large-capacity services.

Figure 1:
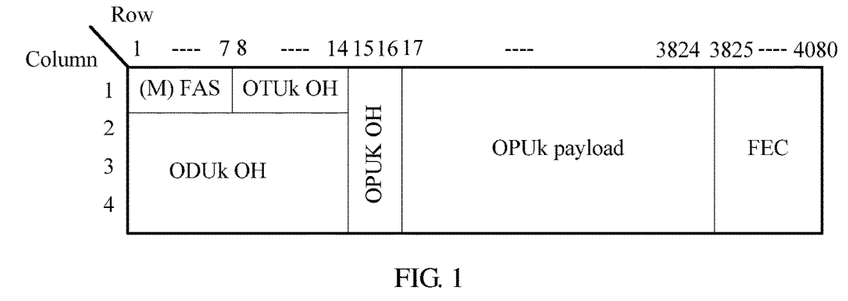
FIG. 1 is a frame structure of an OTN frame.

As shown in FIG. 1, an OTN frame is a 4080×4 modular structure, and includes a frame alignment signal (FAS), providing a frame synchronization function. OTUk OH is an overhead byte of an optical channel transport unit (OTU), and provides a network management function at an OTU level. ODUk OH is an overhead byte of an optical channel data unit (ODU), and provides maintenance and operation functions. OPUk OH is an overhead byte of an optical channel payload unit (OPU), and provides a customer signal adaptation function. OPUk payload is the OPU, and provides a customer signal bearer function. FEC is a FEC byte, and provides error detection and error correction functions. The coefficient k represents a supported bit rate and different types of OPUks, ODUks, and OTUks. If k=1, it indicates that a bit rate level is 2.5 gigabits per second (Gbit/s), if k=2, it indicates that a bit rate level is 10 Gbit/s, if k=3, it indicates that a bit rate level is 40 Gbit/s, if k=4, it indicates that a bit rate level is 100 Gbit/s, and if k=flex, it indicates that a bit rate is arbitrary.

An OTN may be used to transparently transmit various communications services. A packet service is a typical one in the various communications services. In the packet service, a service is transmitted using a packet. A length of each packet is variable, and an idle character usually exists between adjacent packets. A quantity of idle characters is also variable.

Currently, for transmission of a packet service, the OTN usually uses a Generic Framing Procedure (GFP) mapping manner. In this manner, the packet service is first encapsulated into a GFP frame, and then the GFP frame is mapped to an OPU payload area. As a rate increases, problems inherent in this mapping manner gradually emerge: (1) A byte-granularity mapping manner is used in the GFP. As the rate rapidly increases, if a byte granularity is still used for GFP mapping encapsulation, implementation complexity is greatly increased. (2) Because a GFP frame generated during GFP mapping processing has an unfixed frame length, a position in which a GFP frame header may appear needs to be identified more frequently. In addition, data in each clock cycle is differently processed. This further increases complexity of customer service mapping processing performed at a high rate and a large bit width. (3) Because a GFP core head (core frame header), a Payload head (payload frame header), a frame check sequence (FCS), and the like are added to the GFP frame generated during the GFP mapping processing, bandwidth utilization is lowered.

SUMMARY

In view of this, embodiments of the present disclosure provide a data processing method, a communications device, and a communications system.

According to a first aspect, an embodiment of the present disclosure provides a data processing method, where the method is applied to an OTN, and the method includes obtaining a code block stream that carries a packet service, performing rate adaptation on the obtained code block stream, and mapping the rate-adapted code block stream to an OPU signal.

With reference to the first aspect, in a first possible implementation, performing rate adaptation on the obtained code block stream includes at least one of inserting an idle code block into the obtained code block stream, or deleting some or all of idle code blocks in the obtained code block stream, where the idle code block is a control code block that includes an idle code block type indicator, and the idle code block does not carry the packet service, where a quantity of to-be-mapped code blocks in the rate-adapted code block stream within each OPU frame period is equal to a preset value $C_m$. Preferably, $C_m$ is equal to a maximum integer value of a quantity of code blocks that can be carried by an OPU payload area.

With reference to any one of the first aspect or the first possible implementation of the first aspect, in a second possible implementation, mapping the rate-adapted code block stream to an OPU signal includes mapping $C_m$ code blocks to one OPU frame within each OPU frame period, and inserting $C_m$ into an overhead of the OPU frame.

With reference to any one of the first aspect, the first or the second possible implementation of the first aspect, in a third possible implementation, mapping the rate-adapted code block stream to an OPU signal includes mapping the rate-adapted code block stream to the OPU signal according to a fixed mapping pattern.

With reference to any one of the first aspect, or the first or the second or the third possible implementation of the first aspect, in a fourth possible implementation, inserting an idle code block into the obtained code block stream includes inserting an idle code block between a T code block and an S code block that are adjacent in the obtained code block stream, where the T code block indicates a code block that includes a packet service end character, and the S code block indicates a code block that includes a packet service start character.

With reference to any one of the first aspect, or the first to the fourth possible implementation of the first aspect, in a fifth possible implementation, the obtained code block stream is a 64B/66B code block stream, and a code block type field of the idle code block is 0x1e. Furthermore, "X"B/"Y"B indicates encoding X-bit data to be transmitted as Y-bit entity and in an embodiment term "bits" represented with B.

With reference to any one of the first aspect, the first to the third possible implementations of the first aspect, in a sixth possible implementation, the obtained code block stream is a 64B/66B code block stream, and a code block type field of the idle code block is 0x88, where inserting an idle code block into the obtained code block stream includes inserting an idle code block into a first position of the obtained code block stream, where the first position is any position in the obtained code block stream.

With reference to any one of the first aspect, or the first to the sixth possible implementation of the first aspect, in a seventh possible implementation, the idle code block further carries at least one of a packet service port number or a packet service type indicator.

With reference to any one of the first aspect, or the first to the seventh possible implementations of the first aspect, in an eighth possible implementation, performing rate adaptation on the obtained code block stream includes deleting some or all of idle code blocks in the obtained code block stream, where the idle code block is a control code block that includes an idle code block type indicator, and the idle code block does not carry the packet service.

With reference to any one of the first aspect, or the first to the eighth possible implementations of the first aspect, in a ninth possible implementation, performing rate adaptation on the obtained code block stream includes performing code block conversion on the code block stream into which an idle code block is inserted or from which an idle code block is deleted, where the code block conversion includes compressing a 2-bit synchronization header of each code block into 1 bit, where when the 1 bit is filled with 1, it indicates that a corresponding code block is a control code block, and when the 1 bit is filled with 0, it indicates that a corresponding code block is a data code block.

With reference to any one of the first aspect, or the first to the ninth possible implementations of the first aspect, in a tenth possible implementation, mapping the rate-adapted code block stream to an OPU signal includes filling 0x1D in a payload type (PT) indicator field of the OPU signal in order to indicate that the mapping manner is a manner in which the rate-adapted code block stream is directly mapped.

With reference to any one of the first aspect, or the first to the tenth possible implementations of the first aspect, in an eleventh possible implementation, the OPU is a flexible OPU (OPUflex).

According to a second aspect, an embodiment of the present disclosure provides a data processing method, where the method is applied to an OTN, and the method includes receiving an OPU signal, performing demapping process on the OPU signal, deleting an idle code block in the code block stream obtained by means of the demapping process, where the idle code block is a control code block that includes an idle code block type indicator, and the idle code block does not carry a packet service, and obtaining the packet service from the code block stream from which the idle code block is deleted.

With reference to the second aspect, in a first possible implementation, performing demapping process on the OPU signal includes performing the demapping process on the OPU signal according to a preset value $C_m$, where $C_m$ is a quantity of code blocks carried in an OPU frame.

With reference to the first aspect or the first possible implementation of the second aspect, in a second possible implementation, performing demapping process on the OPU signal includes performing the demapping process on the OPU signal according to a fixed mapping pattern.

With reference to any one of the second aspect, or the first and the second possible implementations of the second aspect, in a third possible implementation, deleting an idle code block in the code block stream obtained by means of the demapping process includes identifying the idle code block type indicator, and deleting a code block that includes the idle code block type indicator.

With reference to any one of second aspect, or the first to the third possible implementations of the second aspect, in a fourth possible implementation, the idle code block further carries at least one of a packet service port number or a packet service type indicator.

With reference to any one of the second aspect, or the first to the fourth possible implementations of the second aspect, in a fifth possible implementation, performing demapping process on the OPU signal includes demapping a 65B code block stream from the OPU signal, and converting a synchronization header of each 65B code block from 1 bit into 2 bits to obtain a 64B/66B code block.

According to a third aspect, a communications device is provided, where the communications device includes a processing component configured to obtain a code block stream that carries a packet service, perform rate adaptation on the obtained code block stream, and map the rate-adapted code block stream to an OPU signal.

With reference to the third aspect, in a first possible implementation, the processing component includes an obtaining unit, a rate adaptation unit, and a mapping unit, where the obtaining unit is configured to obtain the code block stream that carries the packet service, the rate adaptation unit is configured to perform the rate adaptation on the obtained code block stream, and the mapping unit is configured to map the rate-adapted code block stream to the OPU signal.

With reference to the third aspect, or the first possible implementation of the third aspect, in a second possible implementation, the performing rate adaptation on the obtained code block stream includes at least one of inserting an idle code block into the obtained code block stream, or deleting some or all of idle code blocks in the obtained code block stream, where the idle code block is a control code block that includes an idle code block type indicator, and the idle code block does not carry the packet service, where a quantity of to-be-mapped code blocks in the rate-adapted code block stream within each OPU frame period is equal to a preset value $C_m$. Preferably, $C_m$ is equal to a maximum integer value of a quantity of code blocks that can be carried by an OPU payload area.

With reference to any one of the third aspect, or the first and the second possible implementations of the third aspect, in a third possible implementation, mapping the rate-adapted code block stream to an OPU signal includes mapping $C_m$ code blocks to one OPU frame within each OPU frame period according to a fixed mapping pattern, and inserting $C_m$ into an overhead of the OPU frame.

With reference to any one of the third aspect, or the first to the third possible implementations of the third aspect, in a fourth possible implementation, the obtained code block stream is a 64B/66B code block stream, and a code block type field of the idle code block is 0x88, where inserting an idle code block into the obtained code block stream includes inserting an idle code block into a first position of the obtained code block stream, where the first position is any position in the obtained code block stream.

With reference to the third aspect, or the first to the fourth possible implementations of the third aspect, in a fifth possible implementation, performing rate adaptation on the obtained code block stream includes deleting some or all of idle code blocks in the obtained code block stream, where the idle code block is a control code block that includes an idle code block type indicator, and the idle code block does not carry the packet service.

With reference to any one of the third aspect, or the first to the fifth possible implementations of the third aspect, in a sixth possible implementation, performing rate adaptation on the obtained code block stream includes performing code block conversion on the code block stream into which an idle code block is inserted or from which an idle code block is deleted, where the code block conversion includes compressing a 2-bit synchronization header of each code block into 1 bit, where when the 1 bit is filled with 1, it indicates that a corresponding code block is a control code block, and when the 1 bit is filled with 0, it indicates that a corresponding code block is a data code block.

With reference to the third aspect, or the first to the sixth possible implementations of the third aspect, in a seventh possible implementation, mapping the rate-adapted code block stream to an OPU signal includes filling 0x1D in a PT indicator field of the OPU signal in order to indicate that a mapping manner is a manner in which the rate-adapted code block stream is directly mapped.

According to a fourth aspect, a communications device is provided, where the communications device includes a processing component configured to receive an OPU signal, perform demapping process on the OPU signal, delete an idle code block in the code block stream obtained by means of the demapping process, where the idle code block is a control code block that includes an idle code block type indicator, and the idle code block does not carry a packet service, and obtain the packet service from the code block stream from which the idle code block is deleted.

With reference to the fourth aspect, the processing component includes a receiving unit, a demapping unit, a deletion unit, and an obtaining unit, where the receiving unit is configured to receive the OPU signal, the demapping unit is configured to perform the demapping processing on the OPU signal, the deletion unit is configured to delete the idle code block in the code block stream obtained by means of the demapping processing, and the obtaining unit is configured to obtain a packet service from the code block stream from which the idle code block is deleted.

With reference to the fourth aspect, or the first possible implementation of the fourth aspect, performing demapping process on the OPU signal includes performing the demapping process on the OPU signal according to a fixed mapping pattern and a preset value $C_m$, where $C_m$ is a quantity of code blocks carried in an OPU frame.

With reference to any one of the fourth aspect, or the first and the second possible implementations of the fourth aspect, performing demapping process on the OPU signal includes demapping a 65B code block stream from the OPU signal, and converting a synchronization header of each 65B code block from 1 bit into 2 bits to obtain a 64B/66B code block.

According to a fifth aspect, a communications system is provided, where the communications system includes a first communications device and a second communications device, where the first communications device is configured to obtain a code block stream that carries a packet service, perform rate adaptation on the obtained code block stream, and map the rate-adapted code block stream to an OPU signal, and the second communications device is configured to receive the OPU signal, perform demapping processing on the OPU signal, delete an idle code block in the code block stream obtained by means of the demapping processing, where the idle code block is a control code block that includes an idle code block type indicator, and the idle code block does not carry the packet service, and obtain a packet service from the code block stream from which the idle code block is deleted.

Optionally, performing rate adaptation on the obtained code block stream includes at least one of inserting an idle code block into the obtained code block stream, or deleting some or all of idle code blocks in the obtained code block stream, where the idle code block is a control code block that includes an idle code block type indicator, and the idle code block does not carry the packet service, where a quantity of to-be-mapped code blocks in the rate-adapted code block stream within each OPU frame period is equal to a preset value $C_m$, mapping the rate-adapted code block stream to an OPU signal includes mapping $C_m$ code blocks to one OPU frame within each OPU frame period, and inserting $C_m$ into an overhead of the OPU frame, and performing demapping process on the OPU signal includes performing the demapping process on the OPU signal according to $C_m$.

Optionally, mapping the rate-adapted code block stream to an OPU signal includes mapping the rate-adapted code block stream to the OPU signal according to a fixed mapping pattern, and performing demapping process on the OPU signal includes performing the demapping process on the OPU signal according to the fixed mapping pattern.

It may be understood that the communications system provided in this embodiment of the present disclosure includes the communications devices provided in the third aspect and the fourth aspect, and performs the methods provided in the first aspect and the second aspect.

According to a sixth aspect, a computer readable medium is provided, and configured to store an instruction, where when being run by a computer, the instruction drives the computer to perform the methods provided in the first aspect and the second aspect.

For the data processing method, the communications device, and the communications system that are provided in embodiments of the present disclosure, in a process of transmitting a packet service, a code block stream that carries the packet service is first obtained. Then, rate adaptation is performed on the obtained code block stream, and finally, the rate-adapted code block stream is mapped to an OPU signal. Compared with a conventional mapping manner in which a GFP is used, the data processing method, the communications device, and the communications system that are provided in the embodiments of the present disclosure feature low processing complexity and/or high bandwidth utilization.

BRIEF DESCRIPTION OF DRAWINGS

To describe the technical solutions in the embodiments of the present disclosure or in the other approaches more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

A method, an apparatus, and a system that are provided in the embodiments of the present disclosure are all based on same principles and designs. All aspects that are described in the embodiments of the present disclosure and that are not in conflict with each other or that are not parallel to each other may be mutually combined. This is not limited in the embodiments of the present disclosure. For example, a part describes an aspect A, and another part describes an aspect B. The aspect A and the aspect B may be combined by default, provided that the aspect A and the aspect B are not in conflict with each other, or are not two paralleled aspects. Further, for example, an apparatus described in the embodiments of the present disclosure may have all functions mentioned in a method described in the embodiments of the present disclosure in order to implement a corresponding method. Similarly, a method described in the embodiments of the present disclosure may be implemented using an apparatus in the embodiments of the present disclosure. For a method and an apparatus, a frame structure described in the embodiments of the present disclosure is commonly used, and mutual reference may be made.

The method, the communications device, and the communications system that are provided in the embodiments of the present disclosure may be applied to the OTN field. For an OTN technology, the International Telecommunication Union has already formulated a corresponding standard, for example, G.709/Y.1331 published in February, 2012. All content in the standard is incorporated herein by reference in its entirety.

Figure 2:
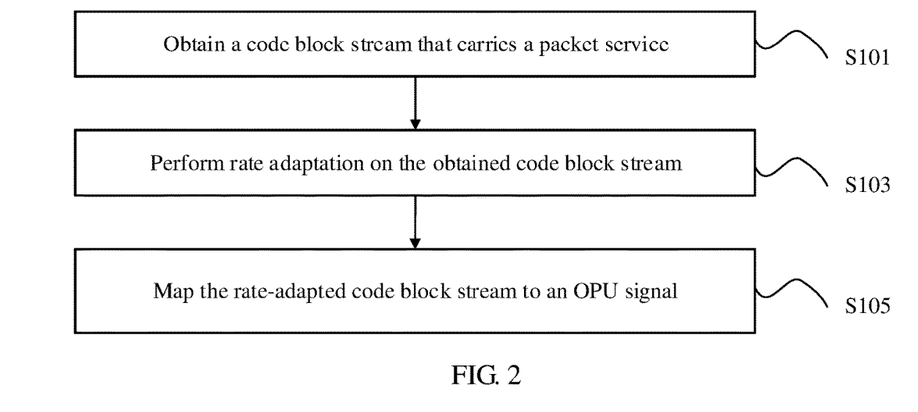
FIG. 2 is a flowchart of a data processing method according to an embodiment of the present disclosure.

As shown in FIG. 2, an embodiment of the present disclosure provides a data processing method. The method is applied to an OTN. The method includes the following steps.

Step S101: Obtain a code block stream that carries a packet service.

The packet service refers to a service based on a packet transfer technology. A length of a packet that carries a service is variable. An idle character is included between adjacent packets. A quantity of idle characters is also variable. The packet service includes an Internet Protocol (IP) service, an Ethernet service, a multiprotocol label switching (MPLS) service, and the like. The code block stream in this embodiment of the present disclosure refers to a data stream including code blocks. The code block may be an 8B/10B code block, a 64B/66B code block, a 64B/65B code block, a 256B/258B code block, a 256B/257B code block, or another code block.

An OTN device obtains a code block stream that carries a packet service in multiple manners. For example, the OTN device may directly receive an original uncoded packet service, such as a packet service from a packet service device or a packet service board, or a service on a local network of the OTN device. In this case, a code block stream that carries a packet service may be obtained by means of coding. For example, 64B/66B coding may be performed on a received packet service in order to obtain a code block stream that carries the packet service. Optionally, the OTN device may receive a coded code block stream from a transmit end. For example, the OTN device may receive a corresponding signal using a physical interface, and then obtain a code block stream after processing at a physical media dependent (PMD) sublayer and a physical medium attachment (PMA) sublayer.

Corresponding to the foregoing descriptions, optionally, the method may further include receiving a packet service, and coding the packet service in order to obtain the code block stream that carries the packet service. Optionally, the method may also include receiving a bit stream that carries a packet service, performing code block synchronization header searching on the bit stream in order to obtain a code block boundary in the bit stream, and performing descrambling processing on a code block data part in the bit stream in order to obtain the code block stream that carries the packet service.

Step S103: Perform rate adaptation on the obtained code block stream.

The rate adaptation performed on the code block stream in this embodiment of the present disclosure may be increasing a code block stream rate, or may be decreasing a code block stream rate, or may further be using a combination thereof (for example, increasing a code block stream rate and decreasing a code block stream rate respectively in different time periods). Increasing a code block stream rate is implemented by adding an idle code block into a code block stream, and decreasing a code block stream rate is implemented by deleting an idle code block originally existing in a code block stream. This embodiment of the present disclosure subsequently describes in detail how to add or delete an idle code block.

Step S105: Map the rate-adapted code block stream to an OPU signal.

Optionally, for specific mapping, a method in the other approaches may be used, or another method described in this embodiment of the present disclosure may be used.

For example, optionally, performing rate adaptation on the obtained code block stream includes at least one of inserting an idle code block into the obtained code block stream, or deleting some or all of idle code blocks in the obtained code block stream. The idle code block is a control code block that includes an idle code block type indicator, and the idle code block does not carry the packet service. A quantity of to-be-mapped code blocks in the rate-adapted code block stream within each OPU frame period is equal to a preset value $C_m$. Preferably, $C_m$ is equal to a maximum integer value of a quantity of code blocks that can be carried by an OPU payload area. Optionally, because $C_m$ is preset, the $C_m$ value does not need to be transmitted to a receive end, that is, the $C_m$ value does not need to be inserted into an overhead.

Optionally, mapping the rate-adapted code block stream to an OPU signal includes mapping $C_m$ code blocks to one OPU frame within each OPU frame period, and inserting $C_m$ into an overhead of the OPU frame.

Optionally, mapping the rate-adapted code block stream to an OPU signal includes mapping $C_m$ code blocks to one OPU frame within each OPU frame period if the preset value $C_m$ is equal to the maximum integer value of the quantity of the code blocks that can be carried by the OPU payload area. Because $C_m$ is a known size of the OPU payload area, $C_m$ information may not be inserted into an overhead of the OPU frame.

Optionally, mapping the rate-adapted code block stream to an OPU signal includes mapping the rate-adapted code block stream to the OPU signal according to a fixed mapping pattern.

Optionally, inserting an idle code block into the obtained code block stream includes inserting an idle code block between a T code block and an S code block that are adjacent in the obtained code block stream, where the T code block indicates a code block that includes a packet service end character, and the S code block indicates a code block that includes a packet service start character.

Optionally, the obtained code block stream is a 64B/66B code block stream, and a code block type field of the idle code block is 0x1e.

Optionally, the obtained code block stream is a 64B/66B code block stream, and a code block type field of the idle code block is 0x88, and inserting an idle code block into the obtained code block stream includes inserting an idle code block into a first position of the obtained code block stream, where the first position is any position in the obtained code block stream.

Optionally, the idle code block further carries at least one of a packet service port number or a packet service type indicator.

Optionally, performing rate adaptation on the obtained code block stream includes deleting some or all of idle code blocks in the obtained code block stream, where the idle code block is a control code block that includes an idle code block type indicator, and the idle code block does not carry the packet service.

Optionally, performing rate adaptation on the obtained code block stream includes performing code block conversion on the code block stream into which an idle code block is inserted or from which an idle code block is deleted.

The code block conversion includes compressing a 2-bit synchronization header of each code block into 1 bit, where when the 1 bit is filled with 1, it indicates that a corresponding code block is a control code block, and when the 1 bit is filled with 0, it indicates that a corresponding code block is a data code block.

Optionally, mapping the rate-adapted code block stream to an OPU signal includes filling 0x1D in a PT indicator field of the OPU signal in order to indicate that a mapping manner is a manner in which the rate-adapted code block stream is directly mapped.

Optionally, the OPU in this application may be OPU0, OPU1, OPU2, OPU3, OPU4, or an OPUflex. When OPUflex is used as an example in the following specific descriptions, another OPU type is also applicable.

The following describes how to implement this embodiment of the present disclosure in an OTN with reference to the foregoing general descriptions and corresponding implementations. The following descriptions and explanations are closely combined with the foregoing general descriptions, and for corresponding details, refer to the foregoing general descriptions.

Figure 3:
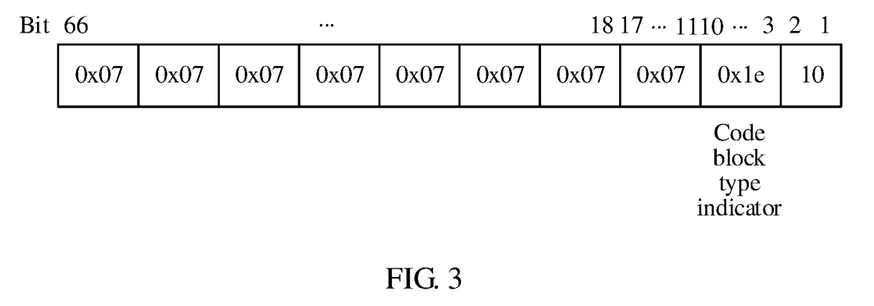
FIG. 3 is a schematic structural diagram of an idle code block according to an embodiment of the present disclosure.

Code Block Stream Rate Adaptation:

After a code block stream that carries a packet service is obtained, a code block in the corresponding code block stream needs to be identified first. Using a 64B/66B code block as an example (another code block is used by analogy), 2-bit synchronization header detection may be performed on a code block stream in order to perform 64B/66B code block synchronization header searching processing, thereby determining a 64B/66B code block boundary. For the 64B/66B code block, if a 2-bit synchronization header is "10", the code block is a control code block, or if the 2-bit synchronization header is "01", the code block is a data code block. For the 64B/66B control code block, block type information of each code block is further checked in order to determine a type of each 64B/66B control code block. A pattern of an idle code block is shown in FIG. 3. The first two bits are 10. The $3^{rd}$ bit to the $10^{th}$ bit are code block type indicator fields that are used to indicate specific control code block types. The idle code block is filled with 0x1e. The $11^{th}$ bit to the $66^{th}$ bit are filled with fixed values.

After each code block is identified, an idle code block may be added to or deleted from the identified 64B/66B code block stream in order to ensure that a data stream rate obtained after adding or deleting an idle code block is less than an OPU payload area rate. When a rate of a received 64B/66B code block stream is greater than the OPU payload area rate, an idle code block is deleted from the 64B/66B code block stream. When the rate of the received 64B/66B code block stream is less than the OPU payload area rate, an idle code block is inserted into the 64B/66B code block stream. A specific implementation may be used. For example, when customer data size in a cache is less than a preset value (for example, a half of a cache waterline of first-in, first-out (FIFO) used for caching), an idle code block is inserted into the 64B/66B code block stream, or when the customer data size in the cache is higher than the preset value, an idle code block is deleted from the 64B/66B code block stream.

Optionally, if mapping processing is performed by automatically generating a $C_m$ value according to a cache waterline in a subsequent mapping step, all identified idle code blocks may be deleted from a data stream in this step, and only a 64B/66B code block stream corresponding to customer service valid data is saved. In this manner, a minimum customer service rate is used to match a rate of an OPU payload area bearer container.

Optionally, if mapping processing is performed by setting a fixed $C_m$ value in subsequent mapping, the foregoing method may still be used. Idle code block adding or deleting processing is performed according to a customer data situation in a cache.

For the foregoing case of inserting an idle code block, a specially defined code block of a special type may be used as an idle code block to be inserted. In this case, the receive end needs to delete the code block of this special type after performing demapping. The method for performing mapping by adding or deleting an idle code block provided in this embodiment of the present disclosure may be referred to as an idle mapping procedure (IMP), or may be referred to as a stuff mapping procedure (SMP).

To add an idle code block into the 64B/66B code block stream corresponding to the customer service valid data, optionally, an O code block may be added to serve as an idle code block for implementation. The O code block may be inserted into any position in the code block stream without changing an original code block. The O code block carries an information pattern shown in FIG. 4. The information pattern includes a 2-bit synchronization header 01, and a 1-byte code block type indicator 0x88 (which may be replaced by any other unused value from 0x00 to 0xFF). The $11^{th}$ bit to the $66^{th}$ bit may be filled with fixed bytes. Optionally, one or more of the $11^{th}$ bit to the $66^{th}$ bit may be used to carry at least one of a packet service port number or a packet service type indicator. For example, the $11^{th}$ bit to the $26^{th}$ bit may be used to carry the packet service port number, and/or the $27^{th}$ bit to the $34^{th}$ bit may be used to carry the packet service type indicator.

Optionally, an existing idle code block shown in FIG. 3 or an idle code block described in the previous paragraph may be used, and be inserted into a position behind the T code block and before the S code block.

In addition, to transmit information such as the packet service port number and the packet service type indicator, an existing S code block may further be modified to an S+ code block. Further, an original S code block in the data stream is modified to an S+ code block. Further, three bytes behind a start character in the S code block may be used to carry and transmit the packet service port number and the packet service type indicator. Because data carried behind the start character is generally a preamble, and the preamble is a fixed stuffing value, after obtaining the transmitted packet service port number and the packet service type indicator, the receive end may recover the value.

Figure 5:
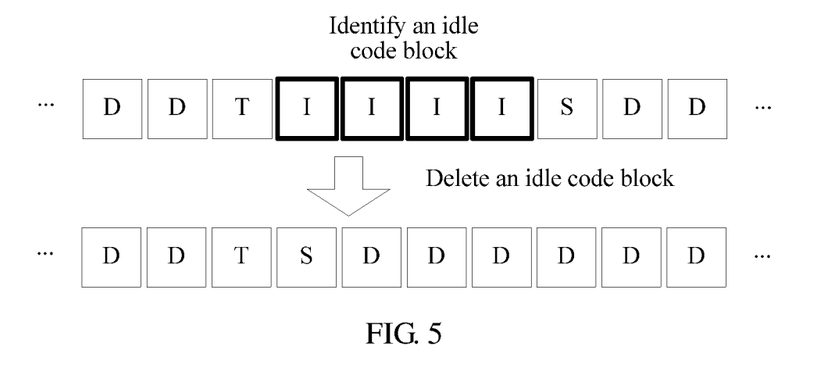
FIG. 5 is a schematic diagram of a method for deleting an idle code block according to an embodiment of the present disclosure.

FIG. 5 schematically provides a process of deleting an idle code block. In FIG. 5, D represents a data code block, S represents an S code block, T represents a T code block, and I represents an idle code block. Optionally, only some of the idle code blocks may be deleted.

Figure 4:
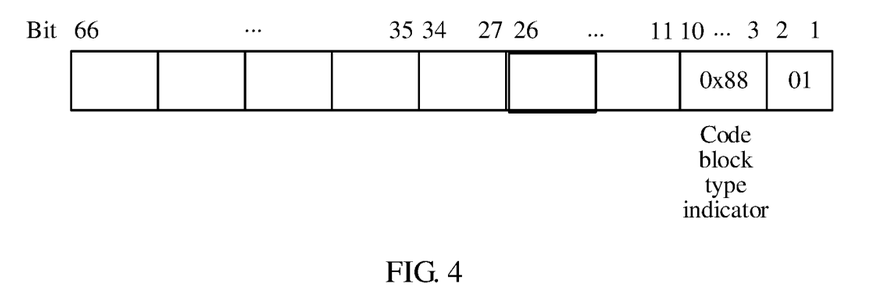
FIG. 4 is a schematic structural diagram of an idle code block according to an embodiment of the present disclosure.
Figure 6:
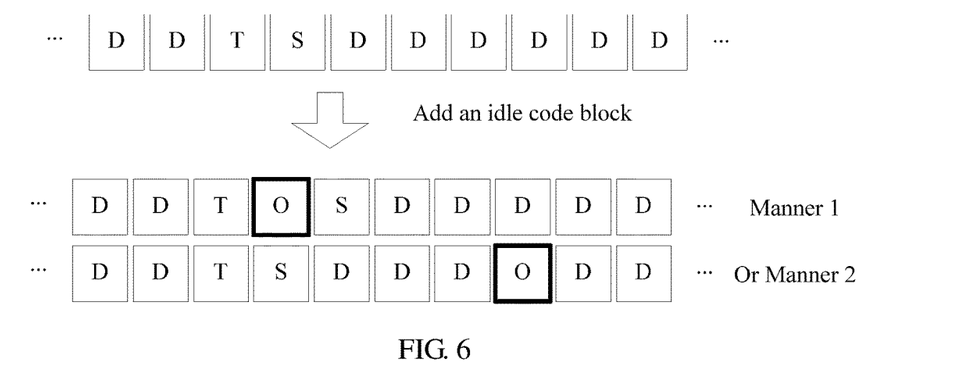
FIG. 6 is a schematic diagram of a method for adding an idle code block according to an embodiment of the present disclosure.

FIG. 6 schematically provides a process of adding an idle code block. In FIG. 6, D represents a data code block, S represents an S code block, T represents a T code block, and O represents an idle code block. In Manner 1 in FIG. 6, the idle code block shown in FIG. 3 may be used, or a new idle code block shown in FIG. 4 may be used. Optionally, a quantity of to-be-inserted idle code blocks may be selected as required. In Manner 2, a new idle code block shown in FIG. 4 is preferably selected. Optionally, a quantity of to-be-inserted idle code blocks may be selected as required. Optionally, when a position into which an idle code block is to be inserted may be randomly selected, and when multiple idle code blocks need to be inserted, the idle code blocks may be inserted in consecutive positions, or may be inserted in non-consecutive positions.

Code Block Conversion Processing:

This embodiment of the present disclosure describes with emphasis specific content about the related "code block conversion processing." The processing step may be selected as required. The processing step may be arranged after code block stream rate adaptation and before mapping. Alternatively, the code block conversion processing may be performed before the code block stream rate adaptation. Code block conversion processing can compress an overall code block rate. This enhances transmission efficiency.

Generally, a code block has a 2-bit synchronization header. The 2-bit synchronization header is used to locate each code block, and is used to indicate whether a code block is a data code block or a control code block. In this embodiment of the present disclosure, after each code block is identified, the 2-bit synchronization header may be compressed into a 1-bit code block. At the receive end, correspondingly, a corresponding 1-bit synchronization header may be restored to 2 bits.

Using a 64B/66B code block as an example (another code block is used by analogy), for a control code block, an original 2-bit synchronization header indicator "10" is compressed into a 1-bit "1", for a data code block, an original 2-bit synchronization header indicator "01" is compressed into a 1-bit "0". The values respectively corresponding to the data code block and the control code block may be transposed. This is not limited in the present disclosure.

Figure 7:
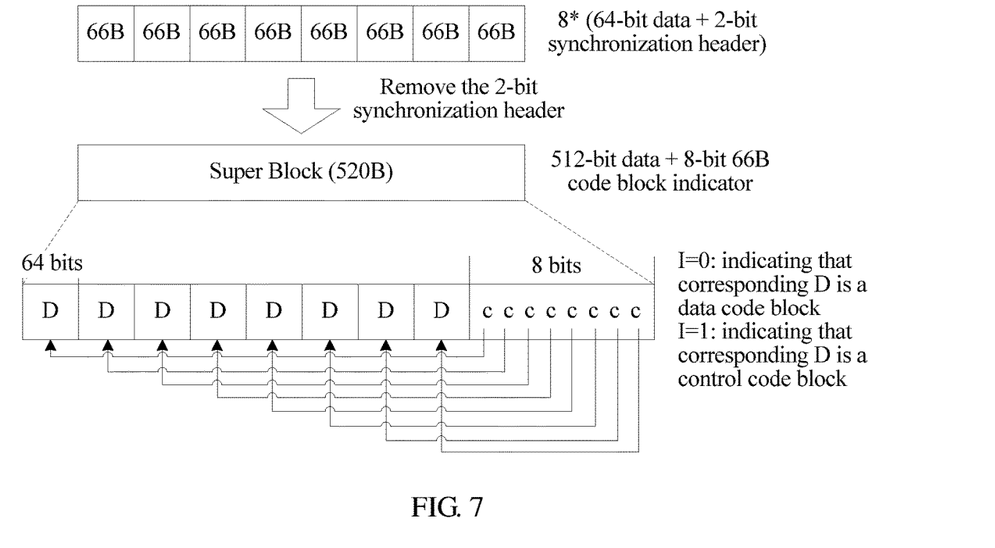
FIG. 7 is a schematic structural diagram of a super block according to an embodiment of the present disclosure.

In addition, the 64B/66B code block (another code block is used by analogy) may further be converted into a super block. As shown in FIG. 7, in this method, every eight 64B/68B code blocks form one super block (65 bytes) that includes a data field and a control field. The data field is 64 bytes (8*8 bytes), and consists of a data part of eight 64B/66B code blocks. The control field is eight bits that respectively indicate whether the 8*8 bytes in the data field are a 64B/66B control code block or a 66B data code block before being converted. 1 (or 0) indicates the 64B/66B control code block, and 0 (or 1) indicates the 64B/66B data code block.

The Super Block May Include Three Types:

(1) c-data: a control super block, which is a super block including control information. A super block pattern of c-data is shown as follows: 8*8 bytes in the first half part are a data field, and 8*1 bits in the second half part is a control field:

SDDDDDDD+10000000, which includes a customer service frame header code block and is located in a super block header; and DDDTSDDD+00001000 (example), which successively includes a customer service frame terminate code block and a frame header code block, and may be located in any seven positions in the super block.

(2) all-data: an all-data super block, which is DDDDDDDD+00000000.

(3) data-idle: a frame terminate super block, which is a super block including frame terminate information. An idle code block represented by I needs to be added according to an actual position of a converted 66B customer service frame terminate code block in the super block, and a super block pattern is as follows:

DDDDDDDI+00000001
DDDDDDII+00000011
DDDDDIII+00000111
DDDDIIII+00001111
DDDIIIII+00011111
DDIIIIII+00111111
DIIIIIII+01111111

Mapping:

This embodiment of the present disclosure describes with emphasis how to perform mapping to an OPU payload area, that is, "mapping a code block or a converted code block to an OPUflex payload area."

(1) A quantity $C_m$ of to-be-mapped customer service code blocks within an OPU frame period is generated. $C_m$ is less than or equal to a size P of the OPU payload area. Optionally, the $C_m$ value may be generated based on a quantity T of code blocks in a current cache. A generation rule is as follows. If T is greater than the size P of the OPU payload area, $C_m$ is equal to P, otherwise, $C_m$ is equal to T. A unit of T, $C_m$, and P is a code block size. In this manner, at a code block stream rate adaptation stage, some or all of idle code blocks in the code block stream may be deleted. Optionally, $C_m$ may be a pre-determined value configured. If the $C_m$ value is less than or equal to the size P of the OPU payload area, $C_m$=P is preferably selected. This manner needs to be matched with code block stream rate adaption processing, that is, during the code block stream rate adaptation processing, properly adding an idle code block or deleting an idle code block enables an overall rate of a to-be-carried code block stream to be matched with a rate of an OPU payload area bearer container. That is, an idle code block is properly added or deleted such that a quantity of to-be-mapped code blocks within each OPU frame period is equal to $C_m$.

(2) $C_m$ code blocks are mapped to the OPU payload area based on a code block granularity and according to a Sigma-delta algorithm, and mapping overhead information $C_m$ is added to an OPU overhead area. Optionally, the OPU payload area includes a bearer area and a fixed stuffing area. The bearer area may be used to carry an integer quantity of code blocks. The fixed stuffing area is filled with a fixed bit. It is worth noted that for a special case in which $C_m$ is equal to P, the Sigma-delta algorithm is not needed (certainly, the Sigma-delta algorithm may also continue to be used), and the $C_m$ code blocks may be directly mapped to the OPU payload area. Optionally, because $C_m$ is a known size of the OPU payload area, the $C_m$ information may be inserted into the OPU overhead area, or may be not inserted into the OPU overhead area.

(3) Optionally, an OPU PT indicator such as 0x1D (in hexadecimal) may be added in order to indicate that an IMP or SMP mapping method is used in the OPU payload area to map a packet service.

Figure 8:
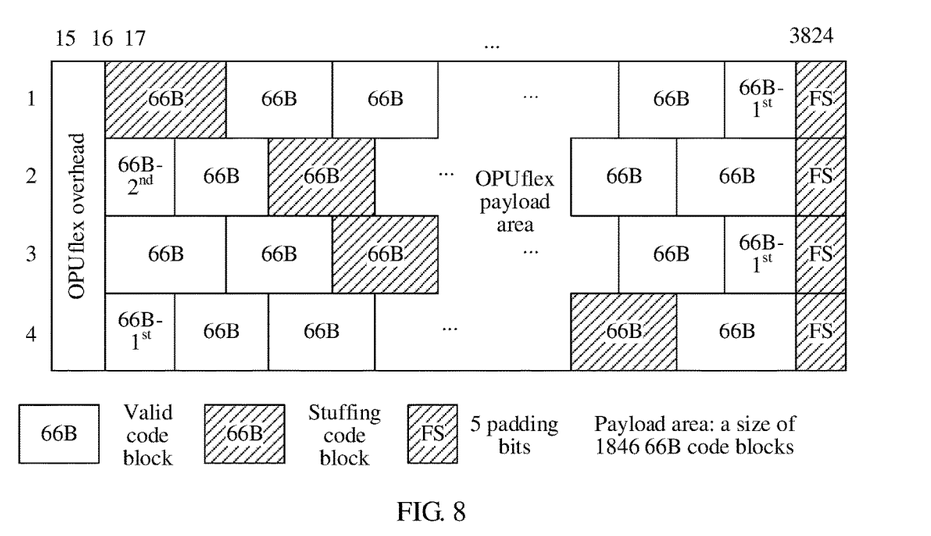
FIG. 8 is a mapping pattern according to an embodiment of the present disclosure.

Optionally, based on an existing OPU frame structure with 4 rows and 3810 columns, the overhead area is the four rows of the 15$^{th}$ and 16$^{th}$ columns, and the payload area is the four rows of 3808 columns. If mapping is performed based on a 64B/66B code block, as shown in FIG. 8, the payload area is divided into 1846 blocks, and terminates of the first to fourth rows are separately filled with 5 padding bits (designated as FS). Based on a 64B/66B code block granularity, a 64B/66B code block stream is mapped to the OPU payload area according to the Sigma-delta algorithm. Shadowed areas are stuffing areas. The mapping overhead information $C_m$ is placed into OPU overhead positions in the first to third rows of the 15$^{th}$ and 16$^{th}$ columns.

Figure 9:
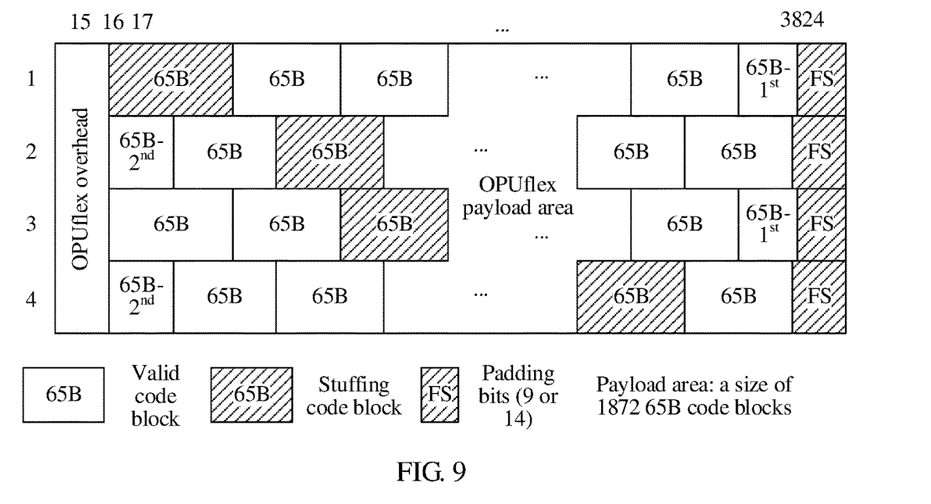
FIG. 9 is a mapping pattern according to an embodiment of the present disclosure.

Optionally, if mapping is performed based on a 65B code block (a converted code block), as shown in FIG. 9, the payload area is divided into 1872 blocks. Terminates of the first and third rows are separately filled with 9 padding bits, and terminates of the second and fourth rows are separately filled with 14 padding bits. Based on a 65B code block granularity, a converted 65B code block stream is mapped to the OPU payload area according to the Sigma-delta algorithm. Shadowed areas are stuffing areas. The mapping overhead information $C_m$ is placed into OPUflex overhead positions in the first to third rows of the 15$^{th}$ and 16$^{th}$ columns.

Figure 10:
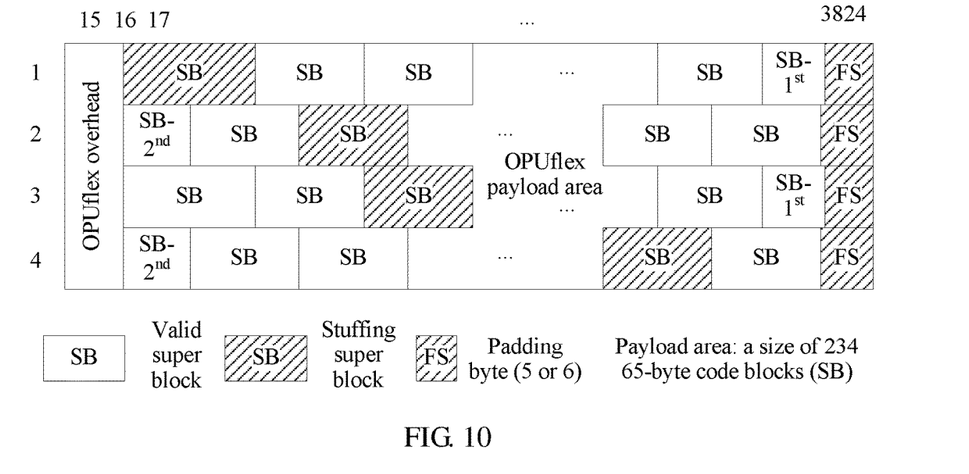
FIG. 10 is a mapping pattern according to an embodiment of the present disclosure.

If mapping is performed based on a 65-byte super block, as shown in FIG. 10, the payload area is divided into 234 65-byte blocks (designated as SB). Terminates of the first and third rows are respectively filled with 5 padding bytes (designated as FS), and terminates of the second and fourth rows are respectively filled with 6 padding bytes (designated as FS). Based on a 65-byte code block granularity, a converted 65-byte super block stream is mapped to the OPUflex payload area according to the Sigma-delta algorithm. Shadowed areas are stuffing areas. The mapping overhead information $C_m$ is placed into OPUflex overhead positions in the first to third rows of the 15$^{th}$ and 16$^{th}$ columns.

Figure 11:
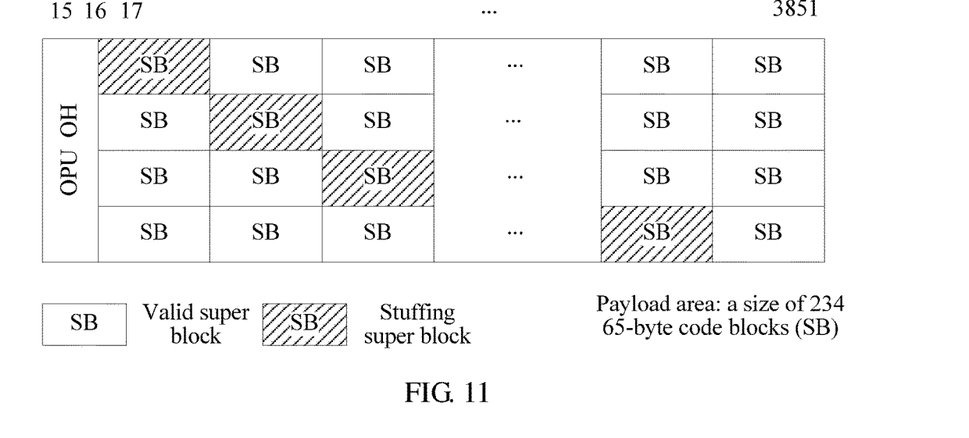
FIG. 11 is a mapping pattern according to an embodiment of the present disclosure.

Optionally, expansion may be performed on the basis of an OPU frame. It is assumed that mapping is performed based on a 65-byte super block. As shown in FIG. 11, an existing OPU frame structure with four rows and 3810 columns is expanded to a structure with four rows and 3837 columns. The overhead area is the four rows of the 15$^{th}$ to 16$^{th}$ columns, and the payload area is the four rows of 3835 columns. The payload area is divided into 236 65-byte super blocks (designated as SB) and no byte needs to be filled in. Based on a 65-byte super block granularity, a converted 65-byte super block stream is mapped to the OPUflex payload area according to the Sigma-delta algorithm. Shadowed areas are stuffing areas. The mapping overhead information $C_m$ is placed into OPUflex overhead positions in the first to third rows of the 15$^{th}$ and 16$^{th}$ columns.

Figure 12:
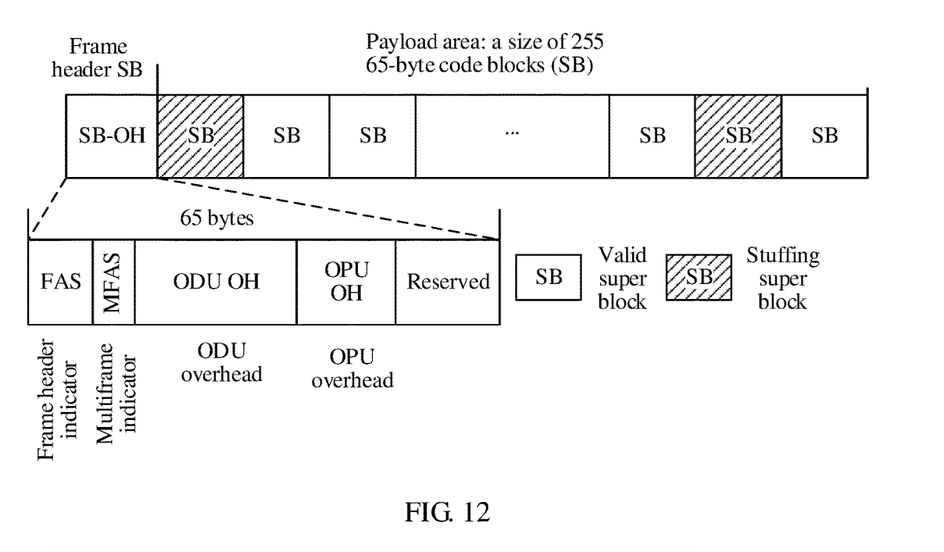
FIG. 12 is a mapping pattern and a new frame structure according to an embodiment of the present disclosure.

Optionally, a new ODU frame structure is constructed. The ODU includes an OPU, and includes an overhead area and a payload area. It is assumed that mapping is performed based on a 65-byte super block. As shown in FIG. 12, 256 super blocks (designated as SB) are included. The overhead area is one frame header overhead super block (designated as SB-OH), and the payload area is divided into 255 super blocks. Based on a 65-byte super block granularity, a converted 65-byte super block stream is mapped to the OPU payload area according to the Sigma-delta algorithm. Shadowed areas are stuffing areas. The mapping overhead information $C_m$ is placed into an OPU overhead position in the frame header overhead code block. As shown in the figure, a frame header overhead code block pattern includes a frame header indicator FAS (6 bytes), a multiframe indicator MFAS (1 byte), an ODU overhead (42 bytes), an OPU overhead (8 bytes), and a reserved area (8 bytes).

Figure 13:
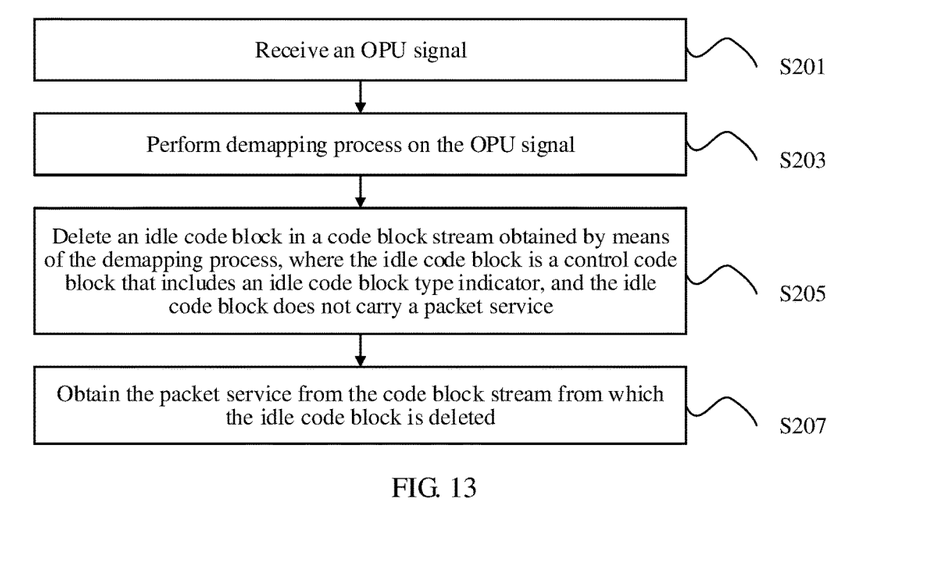
FIG. 13 is a flowchart of a data processing method according to an embodiment of the present disclosure.

An embodiment of the present disclosure further provides a data processing method for a receive end. It may be understood that, the method for the receive end provided in this embodiment of the present disclosure is complementary to the foregoing method for a transmit end, and implementation details of the foregoing implementation method are consistent with or opposite to those in this embodiment of the present disclosure. The method in this embodiment of the present disclosure includes the following steps.

Step S201. Receive an OPU signal.

An OTU signal is received, and then the OPU signal is obtained by means of demultiplexing.

Step S203: Perform demapping process on the OPU signal.

Optionally, a demapping manner is determined according to a PT indicator, and the demapping is performed using a code block as a granularity and according to a $C_m$ value carried in an OPU overhead.

Optionally, the demapping may be performed using a code block as a granularity and according to a preset $C_m$ value.

Step S205: Delete an idle code block in a code block stream obtained by means of the demapping process, where the idle code block is a control code block that includes an idle code block type indicator, and the idle code block does not carry a packet service.

Step S207: Obtain the packet service from the code block stream from which the idle code block is deleted.

Start and end positions of the packet service may be determined according to an S code block and a T code block in the code block stream, and the packet service may be obtained according to the start and end positions.

Optionally, performing demapping process on the OPU signal includes performing the demapping process on the OPU signal according to a preset value $C_m$, where $C_m$ is a quantity of code blocks carried in an OPU frame.

Optionally, the performing demapping process on the OPU signal includes performing the demapping processing on the OPU signal according to a fixed mapping pattern.

Optionally, deleting an idle code block in a code block stream obtained by means of the demapping processing includes identifying the idle code block type indicator, and deleting a code block that includes the idle code block type indicator.

Optionally, the idle code block further carries at least one of a packet service port number or a packet service type indicator.

Optionally, performing demapping process on the OPU signal includes demapping a 65B code block stream from the OPU signal, and converting a synchronization header of each 65B code block from 1 bit to 2 bits to obtain a 64B/66B code block.

An embodiment of the present disclosure further provides a communications device. The communications device provided in this embodiment of the present disclosure may be configured to implement the foregoing methods. Implementation details and technical principles of the foregoing methods are the same as those of this embodiment of the present disclosure, and may be combined with each other.

The communications device in this embodiment of the present disclosure includes a processing component configured to obtain a code block stream that carries a packet service, perform rate adaptation on the obtained code block stream, and map the rate-adapted code block stream to an OPU signal.

Optionally, the processing component includes an obtaining unit, a rate adaptation unit, and a mapping unit. The obtaining unit is configured to obtain the code block stream that carries the packet service, the rate adaptation unit is configured to perform the rate adaptation on the obtained code block stream, and the mapping unit is configured to map the rate-adapted code block stream to the OPU signal.

Optionally, performing rate adaptation on the obtained code block stream includes at least one of inserting an idle code block into the obtained code block stream, or deleting some or all of idle code blocks in the obtained code block stream, where the idle code block is a control code block that includes an idle code block type indicator, and the idle code block does not carry the packet service, where a quantity of to-be-mapped code blocks in the rate-adapted code block stream within each OPU frame period is equal to a preset value $C_m$.

Optionally, mapping the rate-adapted code block stream to an OPU signal includes mapping $C_m$ code blocks to one OPU frame within each OPU frame period according to a fixed mapping pattern, and inserting $C_m$ into an overhead of the OPU frame.

Optionally, the obtained code block stream is a 64B/66B code block stream, and a code block type field of the idle code block is 0x88, where inserting an idle code block into the obtained code block stream includes inserting an idle code block into a first position of the obtained code block stream, where the first position is any position in the obtained code block stream.

Optionally, performing rate adaptation on the obtained code block stream includes deleting some or all of idle code blocks in the obtained code block stream, where the idle code block is a control code block that includes an idle code block type indicator, and the idle code block does not carry the packet service.

Optionally, performing rate adaptation on the obtained code block stream includes performing code block conversion on the code block stream into which an idle code block is inserted or from which an idle code block is deleted, where the code block conversion includes compressing a 2-bit synchronization header of each code block into 1 bit, where when the 1 bit is filled with 1, it indicates that a corresponding code block is a control code block, and when the 1 bit is filled with 0, it indicates that a corresponding code block is a data code block.

Optionally, mapping the rate-adapted code block stream to an OPU signal includes filling 0x1D in a PT indicator field of the OPU signal in order to indicate that a mapping manner is a manner in which the rate-adapted code block stream is directly mapped.

The processing component in this embodiment of the present disclosure may be one of a digital signal processor (DSP), a field programmable gate array (FPGA), or an application-specific integrated circuit (ASIC). The corresponding obtaining unit, rate adaptation unit, and mapping unit may be understood as independent or integrated functional modules in the processing component.

Optionally, the processing component in this embodiment of the present disclosure may include interconnected processors, and one or more memories. The one or more memories are configured to store an instruction in one aspect, and configured to cache data in another aspect. The processor may be configured to execute the instruction stored in the memory. In addition, driven by of the instruction, the processor performs a corresponding method in the embodiments of the present disclosure in order to implement functions of the communications device in this embodiment of the present disclosure. The corresponding processor may be one of a DSP, an FPGA, or an ASIC. The one or more memory may be one or more of a read-only memory (ROM), a random access memory (RAM), a FIFO memory, or may be another storage medium.

Optionally, the communications device provided in this embodiment of the present disclosure may further include a receiver and a transmitter. The receiver is configured to receive a signal, and the transmitter is configured to send a signal. Further, the receiver is configured to receive an optical signal, and perform optical-to-electrical conversion on the optical signal. Optionally, the receiver may further include an analog to digital converter configured to perform analog-to-digital conversion on an electrical signal obtained after the optical-to-electrical conversion. The transmitter may be a laser.

It may be understood that, all methods in the embodiments of the present disclosure may be performed by the communications device provided in this embodiment of the present disclosure, that is, the communications device provided in this embodiment of the present disclosure has functions for performing some or all of the foregoing methods. Further, a corresponding function may be implemented by the processing component in the communications device, and may be implemented by a corresponding refined functional module in a corresponding processing unit. Alternatively, all the methods provided in the embodiments of the present disclosure may be converted into instructions by means of programming or in another manner. The instructions are stored in a corresponding computer readable medium, or fixed in corresponding hardware. When being executed, the instructions may drive a processing unit configured to execute the instructions, to implement the methods described in the embodiments of the present disclosure.

An embodiment of the present disclosure further provides a communications device, where the communications device includes a processing component configured to receive an OPU signal, perform demapping processing on the OPU signal, delete an idle code block in the code block stream obtained by means of the demapping process, where the idle code block is a control code block that includes an idle code block type indicator, and the idle code block does not carry a packet service, and obtain a packet service from the code block stream from which the idle code block is deleted.

Optionally, the processing component includes a receiving unit, a demapping unit, a deletion unit, and an obtaining unit, where the receiving unit is configured to receive the OPU signal, the demapping unit is configured to perform the demapping processing on the OPU signal, the deletion unit is configured to delete the idle code block in the code block stream obtained by means of the demapping processing, and the obtaining unit is configured to obtain the packet service from the code block stream on which the processing of deleting an idle code block is performed.

Optionally, performing demapping process on the OPU signal includes performing the demapping process on the OPU signal according to a fixed mapping pattern and a preset value $C_m$, where $C_m$ is a quantity of code blocks carried in an OPU frame.

Optionally, performing demapping process on the OPU signal includes demapping a 65B code block stream from the OPU signal, and converting a synchronization header of each 65B code block from 1 bit to 2 bits to obtain a 64B/66B code block.

The processing component in this embodiment of the present disclosure may be one of a DSP, an FPGA, or an ASIC. The corresponding obtaining unit, rate adaptation unit, and mapping unit may be understood as independent or integrated functional modules in the processing component.

Optionally, the processing component in this embodiment of the present disclosure may include interconnected processors, and one or more memories. The one or more memories are configured to store an instruction in one aspect, and configured to cache data in another aspect. The processor may be configured to execute the instruction stored in the memory. In addition, driven by of the instruction, the processor performs a corresponding method in the embodiments of the present disclosure in order to implement functions of the communications device in this embodiment of the present disclosure. The corresponding processor may be one of a DSP, an FPGA, or an ASIC. The one or more memory may be one or more of a ROM, a RAM, a FIFO memory, or may be another storage medium.

Optionally, the communications device provided in this embodiment of the present disclosure may further include a receiver and a transmitter. The receiver is configured to receive a signal, and the transmitter is configured to send a signal. Further, the receiver is configured to receive an optical signal, and perform optical-to-electrical conversion on the optical signal. Optionally, the receiver may further include an analog to digital converter configured to perform analog-to-digital conversion on an electrical signal obtained after the optical-to-electrical conversion. The transmitter may be a laser.

It may be understood that, all methods in the embodiments of the present disclosure may be performed by the communications device provided in this embodiment of the present disclosure, that is, the communications device provided in this embodiment of the present disclosure has functions for performing some or all of the foregoing methods. Further, a corresponding function may be implemented by the processing component in the communications device, and further, may be implemented by a corresponding refined functional module in a corresponding processing unit. Alternatively, all the methods provided in the embodiments of the present disclosure may be converted into instructions by means of programming or in another manner. The instructions are stored in a corresponding computer readable medium, or fixed in corresponding hardware. When being executed, the instructions may drive a processing unit configured to execute the instructions, to implement the methods described in the embodiments of the present disclosure.

An embodiment of the present disclosure provides a communications system. The communications system includes a first communications device and a second communications device. The first communications device is configured to obtain a code block stream that carries a packet service, perform rate adaptation on the obtained code block stream, and map the rate-adapted code block stream to an OPU signal, and the second communications device is configured to receive the OPU signal, perform demapping process on the OPU signal, delete an idle code block in the code block stream obtained by means of the demapping processing, where the idle code block is a control code block that includes an idle code block type indicator, and the idle code block does not carry the packet service, and obtain a packet service from the code block stream on which the processing of deleting an idle code block is performed.

Optionally, performing rate adaptation on the obtained code block stream includes at least one of inserting an idle code block into the obtained code block stream, or deleting some or all of idle code blocks in the obtained code block stream, where the idle code block is a control code block that includes an idle code block type indicator, and the idle code block does not carry the packet service, where a quantity of to-be-mapped code blocks in the rate-adapted code block stream within each OPU frame period is equal to a preset value $C_m$. Mapping the rate-adapted code block stream to an OPU signal includes mapping $C_m$ code blocks to one OPU frame within each OPU frame period, and inserting $C_m$ into an overhead of the OPU frame, and performing demapping process on the OPU signal includes performing the demapping process on the OPU signal according to $C_m$.

Optionally, mapping the rate-adapted code block stream to an OPU signal includes mapping the rate-adapted code block stream to the OPU signal according to a fixed mapping pattern, and performing demapping process on the OPU signal includes performing the demapping process on the OPU signal according to the fixed mapping pattern.

The first communications device in this embodiment of the present disclosure may be a transmit end communications device described in the foregoing implementations, and the second communications device in this embodiment of the present disclosure may be a receive end communications device described in the foregoing implementations. Specific implementation details and technical principles of the communications system provided in this embodiment of the present disclosure may be consistent with the foregoing method implementations and communications device implementations, and may be combined with each other.

In addition, an embodiment of the present disclosure further provides a computer readable medium configured to store an instruction. When being run by a computer, the instruction drives the computer to execute foregoing various implementations described in the embodiments of the present disclosure.

According to a data processing method, a communications device, and a communications system that are provided in embodiments of the present disclosure, in a process of transmitting a packet service, a code block stream that carries the packet service is first obtained, then, rate adaptation is performed on the obtained code block stream, and finally, the rate-adapted code block stream is mapped to an OPU signal. Compared with a conventional mapping manner in which a GFP is used, the data processing method, the communications device, and the communications system that are provided in the embodiments of the present disclosure feature low processing complexity and/or high bandwidth utilization.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data processing method, applied to an optical transport network (OTN), comprising:
   obtaining, by an optical device, a code block stream carrying a packet service;
   performing, by the optical device, rate adaptation on the obtained code block stream by inserting an idle code block into the obtained code block stream, wherein the idle code block comprises an idle code block type indicator, and wherein the idle code block does not carry the packet service; and
   mapping, by the optical device, the rate-adapted code block stream to an optical channel payload unit (OPU) signal.

2. The data processing method of claim 1, wherein a quantity of to-be-mapped code Hocks in the rate-adapted code block stream within each OPU frame period is equal to a preset value ($C_m$).

3. The data processing method of claim 1, wherein mapping the rate-adapted code block stream to the OPU signal further comprises:
   mapping $C_m$ code blocks to one OPU frame within each OPU frame period; and
   inserting the $C_m$ code blocks into an overhead of the corresponding OPU frame,
   wherein the $C_m$ code blocks comprise a quantity of to-be-mapped code blocks in the rate-adapted code block stream.

4. The data processing method of claim 1, wherein mapping the rate adapted code block stream to the OPU signal comprises mapping the rate-adapted code block stream to the OPU signal according to a fixed mapping pattern.

5. The data processing method of claim 2, wherein inserting the idle code block into the obtained code block stream comprises inserting the idle code block between a T code block and an S code block that are adjacent in the obtained code block stream, wherein the idle code block further carries at least one of a packet service port number or a packet service type indicator, wherein the T code block indicates a code block comprising a packet service end character, and wherein the S code block indicates a code block comprising a packet service start character.

6. The data processing method of claim 5, wherein the obtained code block stream comprises a sixty-four-bit to sixty-six-bit (64B/66B) code block stream, and wherein a code block type field of the idle code block comprises 0x1e.

7. The data processing method of claim 2, wherein the obtained code block stream comprises a sixty-four-bit to sixty-six-bit (64B/66B) code block stream, wherein a code block type field of the idle code block comprises 0x88, wherein inserting the idle code block into the obtained code block stream comprises inserting the idle code block into a first position of the obtained code block stream, and wherein the first position comprises any position in the obtained code block stream.

8. The data processing method of claim 1, wherein performing the rate adaptation on the obtained code block stream comprises deleting some or all of idle code blocks in the obtained code block stream, wherein the idle code block comprises an idle code block type indicator, and wherein the idle code block does not carry the packet service.

9. The data processing method of claim 1, wherein performing the rate adaptation on the obtained code block stream comprises performing code block conversion on the code block stream into which an idle code block is inserted, wherein the code block conversion comprises compressing a two-bit synchronization header of each code block into one bit, wherein a code block comprises a control code block when the one bit is filled with one, and wherein the code block comprises a data code block when the one bit is filled with zero.

10. The data processing method of claim 1, wherein mapping the rate-adapted code block stream to the OPU signal comprises filling a payload type (PT) indicator field of the OPU signal with 0x1D to indicate that the rate-adapted code block stream is directly mapped.

11. A communications device, comprising:
   a memory comprising instructions; and
   a processor coupled to the memory, wherein the instructions cause the processor to be configured to:
      obtain a code block stream carrying a packet service;
      perform rate adaptation on the obtained code block stream by deleting some or all of idle code blocks in the obtained code block stream, wherein an idle code block comprises an idle code block type indicator, and wherein the idle code block does not carry the packet service; and
      map the rate-adapted code block stream to an optical channel payload unit (GM) signal.

12. The communications device of claim 11, wherein when performing the rate adaptation on the obtained code block stream, the instructions further cause the processor to be configured to insert an idle code block into the obtained code block stream, wherein the idle code block comprises an idle code block type indicator, wherein the idle code block does not carry the packet service, and wherein a quantity of to-be-mapped code blocks in the rate-adapted code block stream within each OPU frame period is equal to a preset value ($C_m$).

13. The communications device of claim 11, wherein a quantity of to-be-mapped code blocks in the rate-adapted code block stream within each OPU frame period is equal to a preset value ($C_m$).

14. The communications device of claim 11, wherein when mapping the rate-adapted code block stream to the OPU signal, the instructions further cause the processor to be configured to:
  map $C_m$ code blocks to one OPU frame within each OPU frame period according to a fixed mapping pattern; and
  insert the $C_m$ code blocks into an overhead of the corresponding OPU frame,
  wherein the $C_m$ code blocks comprise a quantity of to-be-mapped code blocks in the rate-adapted code block stream.

15. The communications device of claim 12, wherein the obtained code block stream comprises a sixty-four-bit to sixty-six-bit (64B/66B) code block stream, wherein a code block type field of the idle code block comprises 0x88, wherein when inserting the idle code block into the obtained code Hock stream, the instructions further cause the processor to be configured to insert the idle code block into a first position of the obtained code block stream, and wherein the first position comprises any position in the obtained code block stream.

16. A communications device, comprising:
  a memory, comprising instructions; and
  a processor coupled to the memory, wherein the instructions cause the processor to be configured to:
    receive an optical channel payload unit (OPU) signal;
    perform de/mapping processing on the OPU signal;
    delete an idle code block in a code block stream obtained from the demapping processing, wherein the idle code block comprises an idle code block type indicator, and wherein the idle code block does not carry a packet service; and
    obtain the packet service from the code block stream which the idle code block is deleted.

17. The communications device of claim 16, wherein when performing the demapping processing on the OPU signal, the instructions further cause the processor to be configured to perform the demapping processing on the OPU signal according to a fixed mapping pattern and a preset value ($C_m$), wherein the $C_m$ comprises a quantity of code blocks carried in an OPU frame.

18. The data processing method of claim 1, wherein performing the rate adaptation on the obtained code block stream comprises deleting some or all of idle code blocks in the obtained code block stream, wherein the idle code block comprises an idle code block type indicator, wherein the idle code block does not carry the packet service, and wherein a quantity of to-be-mapped code blocks in the rate-adapted code block stream within each OPU frame period is equal to a preset value ($C_m$).

19. The data processing method of claim 1, wherein performing the rate adaptation on the obtained code block stream comprises performing code block conversion on the code block stream from which an idle code block is deleted, wherein the code block conversion comprises compressing a two-bit synchronization header of each code block into one bit, wherein a code block comprises a control code block when the one bit is filled with one, and wherein the code block comprises a data code block when the one bit is filled with zero.

20. A data processing method, applied to an optical transport network (OTN), comprising:
  obtaining, by an optical device, a code block stream carrying a packet service;
  performing, by the optical device, rate adaptation on the obtained code block stream by deleting some or all of idle code blocks in the obtained code block stream, Wherein the idle code block comprises an idle code block type indicator, and wherein the idle code block does not carry the packet service; and
  mapping, by the optical device, the rate-adapted code block stream to an optical channel payload unit (OPU) signal.

* * * * *

UNITED STATES PATENT AND TRADEMARK OFFICE
CERTIFICATE OF CORRECTION

PATENT NO. : 10,462,471 B2
APPLICATION NO. : 15/835013
DATED : October 29, 2019
INVENTOR(S) : Wei Su and Maarten Petrus Joseph Vissers It is certified that error appears in the above-identified patent and that said Letters Patent is hereby corrected as shown below:

On the Title Page

2nd Page, Foreign Patent Documents, Last Foreign Patent: "CN 2012004839 A 1/2012" should read "JP 2012004839 A 1/2012"

In the Claims

Claim 2, Column 19, Line 58: "code Hocks" should read "code blocks"

Claim 11, Column 20, Line 65: "unit (GM) signal" should read "unit (OPU) signal"

Claim 15, Column 21, Line 29: "code Hock" should read "code block"

Claim 20, Column 22, Line 37: "ide code" should read "idle code"

Claim 20, Column 22, Line 38: "Wherein the idle" should read "wherein the idle"

Signed and Sealed this
Tenth Day of December, 2019

Andrei Iancu
*Director of the United States Patent and Trademark Office*